United States Patent
Yu et al.

(10) Patent No.: US 11,706,784 B2
(45) Date of Patent: Jul. 18, 2023

(54) RESOURCE ALLOCATION METHOD AND APPARATUS, AND RESOURCE DETERMINING METHOD AND APPARATUS

(71) Applicant: Huawei Technologies Co., Ltd., Shenzhen (CN)

(72) Inventors: Zheng Yu, Beijing (CN); Chao Luo, Shenzhen (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 17/345,847

(22) Filed: Jun. 11, 2021

(65) Prior Publication Data

US 2021/0314957 A1 Oct. 7, 2021

Related U.S. Application Data

(63) Continuation of application No. 16/557,334, filed on Aug. 30, 2019, now Pat. No. 11,057,900, which is a (Continued)

(51) Int. Cl.
*H04W 72/04* (2023.01)
*H04W 72/53* (2023.01)
(Continued)

(52) U.S. Cl.
CPC .......... *H04W 72/53* (2023.01); *H04W 4/80* (2018.02); *H04W 16/26* (2013.01); *H04W 72/23* (2023.01)

(58) Field of Classification Search
CPC ....... H04W 72/53; H04W 16/26; H04W 4/80; H04W 72/23; H04L 5/0094; H04L 5/0044
See application file for complete search history.

(56) References Cited

U.S. PATENT DOCUMENTS

| 2013/0016694 A1 | 1/2013 | Nimbalker et al. |
| 2014/0029537 A1 | 1/2014 | Golitschek Edler Von Elbwart et al. |

(Continued)

FOREIGN PATENT DOCUMENTS

| CN | 102448175 A | 5/2012 |
| CN | 103427970 A | 12/2013 |
| JP | 2012238938 A | 12/2012 |

OTHER PUBLICATIONS

"Resource allocation for larger channel bandwidth for FeMTC," 3GPP TSG-RAN WG1 Meeting #88, Athens, Greece, R1-1701984, pp. 1-10, 3rd Generation Partnership Project, Valbonne, France (Feb. 13-17, 2017).

(Continued)

*Primary Examiner* — Chi Ho A Lee
(74) *Attorney, Agent, or Firm* — Leydig, Voit & Mayer, Ltd.

(57) ABSTRACT

A resource allocation method is provided, which includes: determining a resource block allocation field in downlink control information, where in response to a value indicated by five least significant bits of the resource block allocation field is greater than 20, the resource block allocation field indicates a quantity of resource block groups allocated to a terminal device and an index of a starting resource block group allocated to the terminal device. The method can be applied to the Internet of Things, such as MTC, IoT, LTE-M, M2M, etc.

7 Claims, 4 Drawing Sheets

Related U.S. Application Data continuation of application No. PCT/CN2017/075652, filed on Mar. 3, 2017.

(51) Int. Cl.
  *H04W 4/80* (2018.01)
  *H04W 16/26* (2009.01)
  *H04W 72/23* (2023.01)

(56) References Cited

U.S. PATENT DOCUMENTS

| | | | |
|---|---|---|---|
| 2016/0330718 | A1 | 11/2016 | Kim et al. |
| 2017/0019915 | A1 | 1/2017 | Nogami et al. |
| 2017/0048823 | A1* | 2/2017 | Bharadwaj ............ H04W 72/04 |
| 2018/0049169 | A1 | 2/2018 | Lin et al. |
| 2018/0049201 | A1 | 2/2018 | Hussain et al. |
| 2018/0123744 | A1 | 5/2018 | Nogami et al. |
| 2018/0206263 | A1 | 7/2018 | Lin |
| 2018/0234955 | A1 | 8/2018 | Lin |
| 2018/0317250 | A1* | 11/2018 | Yi .......................... H04L 5/0044 |
| 2019/0007959 | A1 | 1/2019 | Hwang et al. |
| 2019/0059257 | A1 | 2/2019 | Floyd |
| 2019/0215807 | A1* | 7/2019 | Hwang ................. H04L 5/0094 |
| 2019/0288797 | A1* | 9/2019 | Guan ........................ H04L 1/08 |
| 2020/0100248 | A1 | 3/2020 | Kim et al. |
| 2020/0120642 | A1* | 4/2020 | Hwang ................... H04L 5/005 |
| 2020/0185181 | A1 | 6/2020 | Lynch |
| 2020/0187170 | A1 | 6/2020 | Shin et al. |
| 2020/0187237 | A1 | 6/2020 | Su et al. |
| 2020/0196281 | A1 | 6/2020 | Bergman et al. |
| 2021/0167938 | A1* | 6/2021 | Yu ..................... H04W 72/0446 |

OTHER PUBLICATIONS

"3rd Generation Partnership Project; Technical Specification Group Radio Access Network; Evolved Universal Terrestrial Radio Access (E-UTRA); Multiplexing and channel coding (Release 14)," 3GPP TS 36.212 V14.1.1, pp. 1-149, 3rd Generation Partnership Project, Valbonne, France (Jan. 2017).

"DCI design for supporting wider bandwidth in FeMTC," 3GPP TSG RAN WG1 Meeting #87, R1-1611183, pp. 1-5, 3rd Generation Partnership Project, Valbonne, France (Nov. 14-18, 2016).

"3rd Generation Partnership Project; Technical Specification Group Radio Access Network; Evolved Universal Terrestrial Radio Access (E-UTRA); Physical layer procedures (Release 14)," 3GPP TS 36.213 V14.1.0, pp. 1-414, 3rd Generation Partnership Project, Valbonne, France (Dec. 2016).

"Resource allocation and DCI definition for FeMTC," 3GPP TSG-RAN WG1 Meeting #87, R1-1611100, pp. 1-7, 3rd Generation Partnership Project, Valbonne, France (Nov. 14-18, 2016).

"Resource allocation for supporting larger PUSCH channel bandwidths," 3GPP TSG RAN WG1 Meeting #88, Athens, Greece, R1-1701759, pp. 1-5, 3rd Generation Partnership Project, Valbonne, France (Feb. 13-17, 2017).

"Resource allocation for larger PDSCH/PUSCH channel bandwidth," 3GPP TSG RAN WG1 Meeting #88, Athens, Greece, R1-1701852, pp. 1-3, 3rd Generation Partnership Project, Valbonne, France (Feb. 13-17, 2017).

"WF on Resource Allocation for FeMTC UEs with 5MHz PUSCH Channel Bandwidth," 3GPP TSG-RAN WG1 Meeting #88, Athens, Greece, R1-1703969, pp. 1-5, 3rd Generation Partnership Project, Valbonne, France (Feb. 13-17, 2017).

"WF on UL Resource Allocation for FeMTC UEs with 5MHz Channel Bandwidth," 3GPP TSG-RAN WG1 Meeting #88, Athens, Greece, R1-1703984, pp. 1-4, 3rd Generation Partnership Project, Valbonne, France (Feb. 13-17, 2017).

"Consideration on SC-PTM transmission for FeMTC," 3GPP TSG RAN WG1 Meeting #86, Gothenburg, Sweden, R1-167160, pp. 1-4, 3rd Generation Partnership Project, Valbonne, France (Aug. 22-26, 2016).

"Introduction of FeMTC in 36.212," 3GPP TSG RAN WG1 Meeting #88, Athens, Greece, R1-1704147, pp. 1-8, 3rd Generation Partnership Project, Valbonne, France (Feb. 13-17, 2017).

"Resource Allocation and DCI design for FeMTC," 3GPP TSG RAN WG1 Meeting #88, Athens, Greece, R1-1702660, Total 5 pages, 3rd Generation Partnership Project, Valbonne, France (Feb. 13-18, 2017).

"Resource allocation for supporting larger PDSCH channel bandwidth," 3GPP TSG RAN WG1 Meeting #88, Athens, Greece, R1-1701758, Total 8 pages, 3rd Generation Partnership Project, Valbonne, France (Feb. 13-17, 2017).

Intel Corporation, "Frequency domain resource allocation for feMTC," 3GPP TSG RAN WG1 Meeting #88, Athens, Greece, R1-1702149, total 5 pages, 3rd Generation Partnership Project, Valbonne, France (Feb. 13-17, 2017).

Huawei, HiSilicon, "On enabling and disabling of feMTC sub-features," 3GPP TSG RAN WG1 Meeting #87, Reno, USA, R1-1611181, total 3 pages, 3rd Generation Partnership Project, Valbonne, France (Nov. 14-18, 2016).

* cited by examiner

US 11,706,784 B2

RESOURCE ALLOCATION METHOD AND APPARATUS, AND RESOURCE DETERMINING METHOD AND APPARATUS

CROSS-REFERENCE TO RELATED APPLICATIONS

This application is a continuation of U.S. patent application Ser. No. 16/557,334, filed on Aug. 30, 2019, which is a continuation of International Application No. PCT/CN2017/075652, filed on Mar. 3, 2017. All of the afore-mentioned patent applications are hereby incorporated by reference in their entireties.

TECHNICAL FIELD

Embodiments of the present invention relates to the communications field, and in particular, to a resource allocation method and apparatus and a resource determining method and apparatus.

BACKGROUND

In a Long Term Evolution (LTE) system, an access network device needs to allocate a resource to a terminal device, and the resource may be allocated for a physical uplink shared channel (PUSCH) or a physical downlink shared channel (PDSCH). The terminal device sends data or receives data based on the resource allocated by the access network device. An existing resource allocation method includes: allocating, by an access network device, a resource to a terminal device in a system bandwidth by using downlink control information (DCI). A resource allocation field in the DCI may indicate the resource allocated to the terminal device.

With continuous development of the Internet of Things and intelligent terminal devices, bandwidths that can be supported by the terminal devices continuously change: Some terminal devices support relatively small bandwidths, and therefore a resource allocated by an access network device to such a terminal device can be limited only to one narrowband (NB) less than a system bandwidth. For example, one narrowband is six resource blocks (RB). Some terminal devices support relatively large bandwidths. For example, in a coverage enhanced mode A (CE Mode A), an access network device can allocate a maximum of 25 RBs to such a terminal device, and correspondingly, the terminal device sends or receives data on a maximum of 25 RBs in an uplink bandwidth.

FIG. 1 shows a resource allocation manner of the Release 13 DCI format 6-0A in the prior art. During uplink resource allocation, $$\left\lceil \log_2 \left\lfloor \frac{N_{RB}^{UL}}{6} \right\rfloor \right\rceil$$

most significant bits of a resource allocation field in DCI are used to indicate an index of an NB allocated in a system bandwidth, and $N_{RB}^{UL}$ indicates a quantity of RBs included in the uplink system bandwidth. Five least significant bits (bit) of the resource allocation field are used to indicate RB allocation within the NB, and a resource indication value (RIV) corresponding to a binary number of the five bits is used to indicate continuous RB allocation. Therefore, in the prior art, when an access network device allocates a resource to a terminal device, the access network device can perform allocation only for a specific NB in a system bandwidth and RBs within the NB. Consequently, a quantity of RBs allocated to the terminal device is limited, and a resource cannot be flexibly allocated to the terminal device.

SUMMARY

Embodiments of the present invention provide a resource allocation method and apparatus and a resource determining method and apparatus, so that an access network device can flexibly configure a resource for a terminal device.

According to a first aspect, an embodiment of the present invention provides a resource allocation method, including: determining, by an access network device, a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ an uplink bandwidth configuration or a quantity of RBs included in an uplink system bandwidth; where when a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0; or when a value indicated by five least significant bits of the resource block allocation field is greater than 20, the resource block allocation field indicates a first resource indication value, where the first resource indication value indicates a quantity of resource block groups allocated to a terminal device and an index of a starting resource block group allocated to the terminal device, the quantity of allocated resource block groups is greater than or equal to 3 and is less than or equal to 8, and one resource block group includes three resource blocks; and sending, by the access network device, the downlink control information to the terminal device.

Optionally, the resource allocation method is applied to a scenario of a coverage enhanced mode A.

Optionally, the access network device receives, on at least one resource block (RB) allocated to the terminal device, a physical uplink shared channel (PUSCH) sent by the terminal device.

According to a second aspect, an embodiment of the present invention provides a resource determining method, including: obtaining, by a terminal device, a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration; where when a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0; or when a value indicated by five least significant bits of the resource block allocation field is greater than 20, determining a first resource indication value indicated by the resource block allocation field;

determining, based on the first resource indication value, a quantity of resource block groups allocated to the terminal device and an index of a starting resource block group allocated to the terminal device, where the quantity of allocated resource block groups is greater than or equal to 3 and is less than or equal to 8, and one resource block group includes three resource blocks; and determining, by the terminal device, at least one resource block allocated to the terminal device.

Optionally, the resource determining method is applied to a scenario of a coverage enhanced mode A.

Optionally, the terminal device sends a PUSCH on the allocated at least one resource block.

According to a third aspect, an embodiment of the present invention provides an access network device, where the access network device includes a processor and a transceiver, and the processor and the transceiver are communicatively connected to each other;

the processor is configured to determine a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration or a quantity of RBs included in an uplink system bandwidth; where when a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0; or when a value indicated by five least significant bits of the resource block allocation field is greater than 20, the resource block allocation field indicates a first resource indication value, where the first resource indication value indicates a quantity of resource block groups allocated to a terminal device and an index of a starting resource block group allocated to the terminal device, the quantity of allocated resource block groups is greater than or equal to 3 and is less than or equal to 8, and one resource block group includes three resource blocks; and the transceiver is configured to send the downlink control information to the terminal device.

Optionally, the transceiver is further configured to receive, on at least one resource block (RB) allocated to the terminal device, a physical uplink shared channel (PUSCH) sent by the terminal device.

According to a fourth aspect, an embodiment of the present invention provides a terminal device, where the terminal device includes a processor and a transceiver, and the processor and the transceiver are communicatively connected to each other;

the transceiver is configured to obtain a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration; where when a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0; or when a value indicated by five least significant bits of the resource block allocation field is greater than 20, the resource block allocation field indicates a first resource indication value;

the processor is configured to determine, based on the first resource indication value, a quantity of resource block groups allocated to the terminal device and an index of a starting resource block group allocated to the terminal device, where the quantity of allocated resource block groups is greater than or equal to 3 and is less than or equal to 8, and one resource block group includes three resource blocks; and the processor is configured to determine at least one resource block allocated to the terminal device.

Optionally, the transceiver is further configured to send a PUSCH on the allocated at least one resource block.

According to another aspect, an embodiment of the present invention provides a terminal device. The terminal device can implement a function implemented by the terminal device in the foregoing method embodiment. The function may be implemented by hardware, or may be implemented by hardware by executing corresponding software. The hardware or the software includes one or more modules corresponding to the function.

In a possible design, a structure of the terminal device includes a processor and a communications interface. The processor is configured to support the terminal device in implementing the corresponding function in the foregoing method. The communications interface is configured to support communication between the terminal device and a network device or another network element. The terminal device may further include a memory. The memory is configured to be coupled to the processor, and stores a necessary program instruction and data of the terminal device.

According to another aspect, an embodiment of the present invention provides a network device. The network device can implement a function implemented by the network device in the foregoing method embodiment. The function may be implemented by hardware, or may be implemented by hardware by executing corresponding software. The hardware or the software includes one or more modules corresponding to the function.

In a possible design, a structure of the network device includes a processor and a communications interface. The processor is configured to support the network device in implementing the corresponding function in the foregoing method. The communications interface is configured to support communication between the network device and a terminal device or another network element. The network device may further include a memory. The memory is configured to be coupled to the processor, and stores a necessary program instruction and data of the network device.

According to another aspect, an embodiment of the present invention provides a communications system. The system includes the terminal device and the network device described in the foregoing aspects.

According to still another aspect, an embodiment of the present invention provides a computer storage medium, configured to store a computer software instruction used by the foregoing terminal device. The computer software instruction includes a program designed to perform the foregoing aspects.

According to still another aspect, an embodiment of the present invention provides a computer storage medium, configured to store a computer software instruction used by the foregoing network device. The computer software instruction includes a program designed to perform the foregoing aspects.

DESCRIPTION OF EMBODIMENTS

Embodiments of the present invention provide a resource allocation method and apparatus and a resource determining method and apparatus, so that an access network device flexibly allocates a resource to a terminal device, and correspondingly, the terminal device flexibly determines the resource allocated by the access network device.

It should be noted that, the embodiments of the present invention are applicable to various communications systems, for example, a Global System for Mobile Communications (Global system for mobile communications, GSM), a Code Division Multiple Access (CDMA) system, Wideband Code Division Multiple Access (WCDMA), a general packet radio service (GPRS), Long Term Evolution (LTE), and a subsequent evolved system such as a 5th Generation 5G system.

The embodiments of the present invention are applicable to a wireless communications system including an access network device and a terminal device (terminal device or terminal equipment). The terminal device may be a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a terminal device, or user equipment. The access network device may be an access network device, an enhanced access network device, a relay with a scheduling function, a device with an access network device function, or the like. The access network device may be an evolved access network device (evolved NodeB, eNB or eNodeB) in an LTE system, or may be an access network device in another system. This is not limited in the embodiments of the present invention.

The following describes implementations of embodiments the present invention with reference to the accompanying drawings in this specification.

Figure 1:
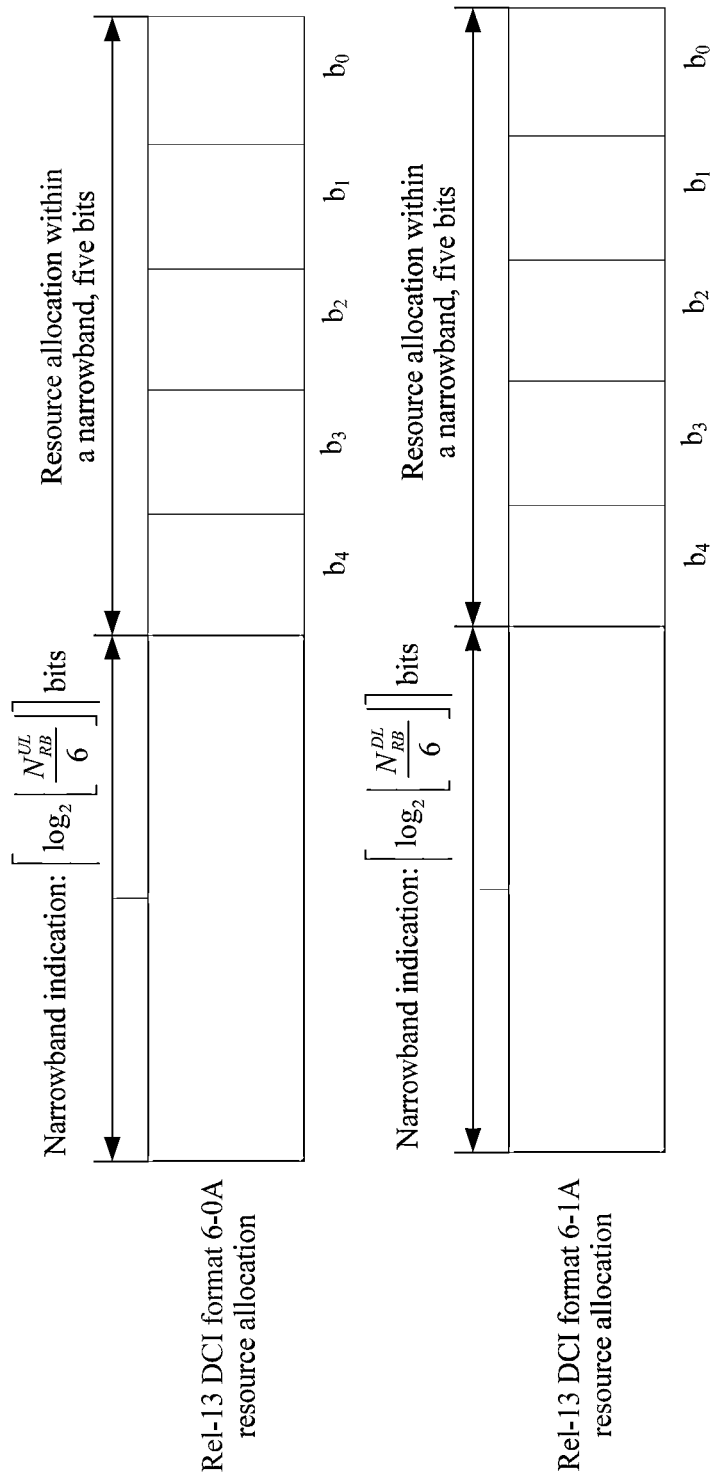
FIG. 1 is a schematic diagram of a DCI format of allocating a resource to a terminal device in the prior art.
Figure 2:
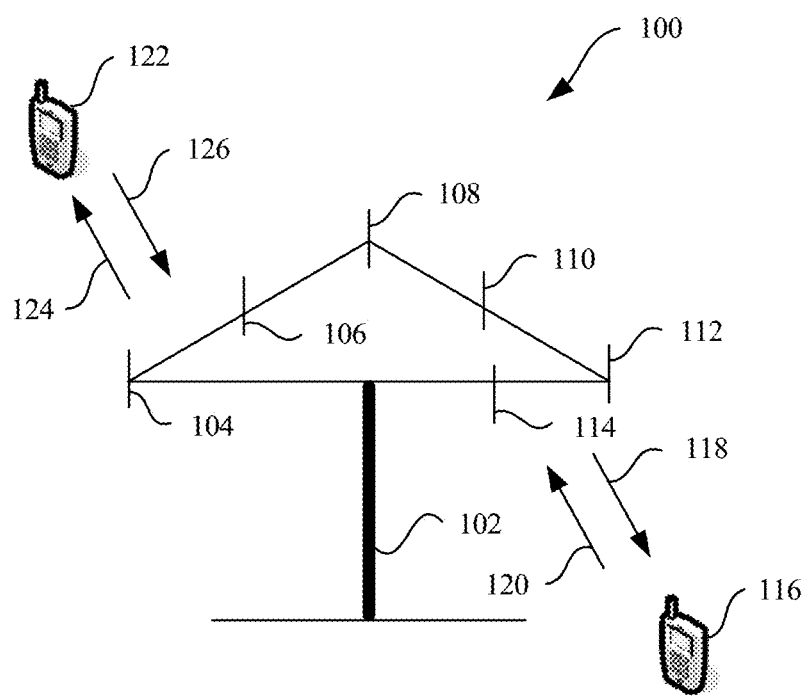
FIG. 2 is a schematic architectural diagram of a communications system applicable to a resource allocation method and apparatus and a resource determining method and apparatus according to an embodiment of the present invention.

FIG. 2 is a schematic architectural diagram of a wireless communications system according to an embodiment of the present invention. As shown in FIG. 2, the communications system 100 includes an access network device 102. The access network device 102 may include one or more antennas, for example, antennas 104, 106, 108, 110, 112, and 114. In addition, the access network device 102 may additionally include a transmitter chain and a receiver chain. A person of ordinary skill in the art may understand that both the transmitter chain and the receiver chain may include a plurality of components (for example, processors, modulators, multiplexers, demodulators, demultiplexers, or antennas) related to signal sending and receiving.

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. The terminal devices 116 and 122 may be, for example, cellular phones, smartphones, portable computers, handheld communications devices, handheld computing devices, satellite radio apparatuses, global positioning systems, PDAs, and/or any other appropriate devices configured to perform communication in the wireless communications system 100.

As shown in FIG. 2, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

In addition, the communications system 100 may be a PLMN network, a D2D network, an M2M network, or another network. FIG. 2 is merely a simplified schematic diagram of an example. The network may further include another access network device that is not shown in FIG. 2.

Figure 3:
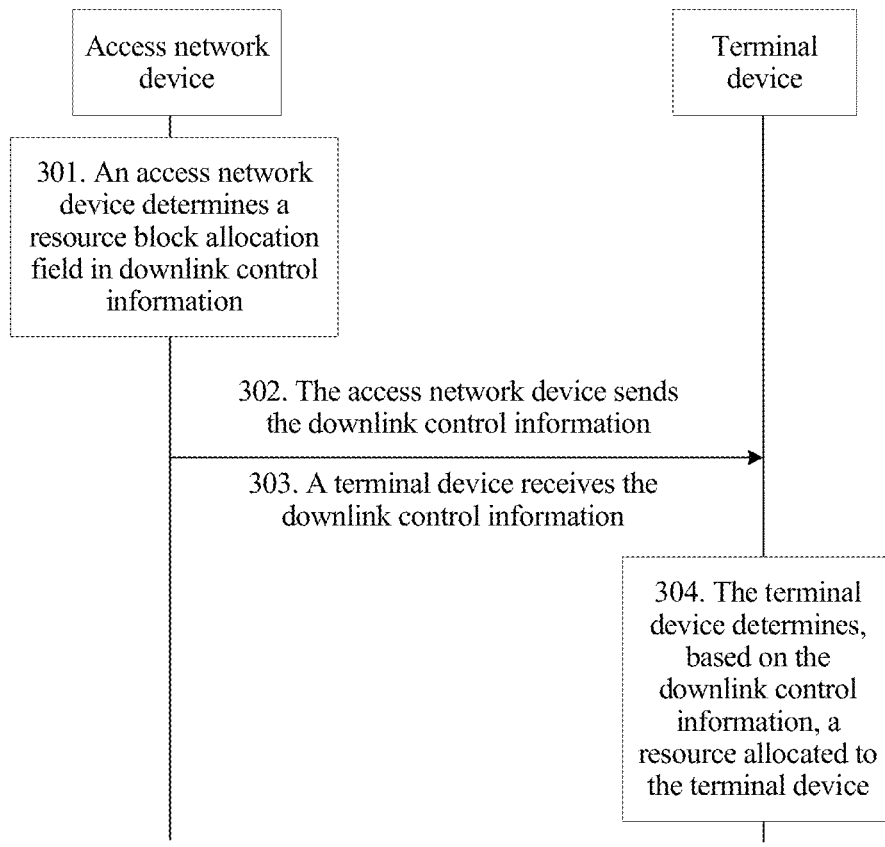
FIG. 3 is a schematic diagram of an interaction process of a resource allocation method and a resource determining method according to an embodiment of the present invention.

FIG. 3 is a schematic diagram of an interaction process of a resource allocation method and a resource determining method according to an embodiment of the present invention. It should be noted that in the embodiment shown in FIG. 3, the following example is used for description: An access network device allocates a resource and sends resource information to a terminal device, and the terminal device receives the resource information from the access network device and determines the resource. However, this embodiment of the present invention is not limited thereto, and technical solutions provided in this embodiment of the present invention are applicable to any communications scenario of sending and/or receiving resource information.

Step 301: An access network device determines a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration or a quantity of RBs included in an uplink system bandwidth.

When a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the resource block allocation field indicates a first resource indication value. The first resource indication value indicates a quantity of resource block groups allocated to a terminal device and an index of a starting resource block group allocated to the terminal device, the quantity of allocated resource block groups is greater than or equal to 3 and is less than or equal to 8, and one resource block group includes three resource blocks.

Step 302: The access network device sends the downlink control information to a terminal device.

Step 303: The terminal device receives the downlink control information sent by the network device.

Step 304: The terminal device determines, based on the downlink control information, at least one resource block allocated to the terminal device.

In the prior art, the five least significant bits of the resource block allocation field include index values 0 to 31 or include a total of 32 usage states 0 to 31. In the index values 0 to 31, only 0 to 20 are used, but 11 index values 21 to 31 are unused. Therefore, when the access network device allocates more than six RBs to the terminal device, the 11 unused index values may be used in this embodiment of the present invention. In this way, the resource block allocation field of $$\left\lceil \log_2 \left\lfloor \frac{N_{RB}^{UL}}{6} \right\rfloor \right\rceil + 5 \text{ bits,}$$

may indicate $$2 \wedge \left\lceil \log_2 \left\lfloor \frac{N_{RB}^{UL}}{6} \right\rfloor \right\rceil * 11$$

unused states. The symbol ^ indicates an exponentiation operation.

When the access network device allocates more than six resource blocks to the terminal device, $$2 \wedge \left\lceil \log_2 \left\lfloor \frac{N_{RB}^{UL}}{6} \right\rfloor \right\rceil * 11$$

states may be used to indicate resource allocation. In this case, an uplink resource may be allocated by using a resource block group as a granularity. For example, one resource block group includes three resource blocks. Because each narrowband includes six resource blocks, each narrowband includes two resource block groups. An uplink bandwidth has $$\left\lfloor \frac{N_{RB}^{UL}}{6} \right\rfloor$$

narrowbands in total, and therefore has $$\left\lfloor \frac{N_{RB}^{UL}}{6} \right\rfloor * 2$$

resource block groups in total. That is, the access network device allocates the resource blocks to the terminal device within all narrowbands included in the uplink bandwidth. The access network device allocates more than six resource blocks to the terminal device, and therefore allocates at least three resource block groups. The access network device allocates a maximum of 25 resource blocks to the terminal device, and therefore allocates a maximum of eight resource block groups. The terminal device may be low-complexity UE or coverage enhanced UE.

Therefore, in the foregoing manner, the access network device can determine the first resource indication value for the terminal device based on the determined quantity of resource block groups and the determined index of the starting resource block group, and indicate the first resource indication value by using the $$\left\lceil \log_2 \left\lfloor \frac{N_{RB}^{UL}}{6} \right\rfloor \right\rceil + 5 \text{ bits}$$

of the resource block allocation field, to flexibly allocate a resource to the terminal device. The access network device may allocate a resource less than or equal to six RBs to the terminal device based on the uplink resource allocation type 0, or may allocate a resource more than six RBs to the terminal device. In the foregoing manner, the terminal device can easily and quickly determine, based on the first resource indication value, the quantity of resource block groups allocated by the access network device and the index of the starting resource block group allocated by the access network device, so that parsing complexity of UE is reduced, and processing time of the UE is shortened, and processing power consumption of the UE is reduced.

Optionally, after step 304, the interaction process further includes step 305: The terminal device may further send a PUSCH based on the determined at least one resource block.

Optionally, after step 305, the interaction process may further include step 306: The access network device receives, on the at least one resource block (RB) allocated to the terminal device, the physical uplink shared channel (PUSCH) sent by the terminal device.

It should be noted that the physical uplink shared channel (PUSCH) is used as an example for description in this embodiment of the present invention. In another optional embodiment, the PUSCH may be replaced with a physical downlink shared channel (PDSCH). That is, in the manner in the foregoing embodiment, the network device determines a resource block allocation field in downlink control information, sends the downlink control information to the terminal device, and sends a physical downlink shared channel (PDSCH) on at least one resource block (RB) allocated to the terminal device; and after receiving the downlink control information, the terminal device determines, based on the downlink control information, the at least one resource block allocated to the terminal device, and receives the PDSCH on the determined at least one resource block. Correspondingly, the $$\left\lceil \log_2 \left\lfloor \frac{N_{RB}^{UL}}{6} \right\rfloor \right\rceil \text{ bits}$$

are replaced with $$\left\lceil \log_2 \left\lfloor \frac{N_{RB}^{UL}}{6} \right\rfloor \right\rceil \text{ bits},$$

where $N_{RB}^{DL}$ is a downlink bandwidth configuration or a quantity of RBs included in a downlink system bandwidth. This is not limited in this embodiment of the present invention.

In an optional embodiment, a value of $$\left\lceil \log_2 \left\lfloor \frac{N_{RB}^{UL}}{6} \right\rfloor \right\rceil$$

is equal to 1. As shown in Table 1, a bit state 0 of one most significant bit of a resource block allocation field is corresponding to 11 unused states of five least significant bits of the resource block allocation field. A bit state 1 of one most significant bit of the resource block allocation field is corresponding to 11 unused states of the five least significant bits of the resource block allocation field. In this case, there are 22 unused states in total.

TABLE 1

| 22 unused states corresponding to $\left\lceil \log_2 \left\lfloor \frac{N_{RB}^{UL}}{6} \right\rfloor \right\rceil_{=1}$ | | | |
|---|---|---|---|
| Bit state of one most significant bit of a resource block allocation field | 11 unused states of five least significant bits of a resource block allocation field | Bit state of one most significant bit of a resource block allocation field | 11 unused states of five least significant bits of a resource block allocation field |
| 0 | 10101 10110 10111 11000 11001 11010 11011 11100 11101 11110 11111 | 1 | 10101 10110 10111 11000 11001 11010 11011 11100 11101 11110 11111 |

It should be noted that 'a value of A is equal to B' in the present invention means that the value of A is equal to a value of B, but does not necessarily mean that A=B. For example, if A=C and C=B, a value of A is equal to a value of B. Any case in which a value of A is equal to B (or a value of B) means that 'the value of A is equal to B' in the present invention. Herein, A and B are merely symbols, and specific meanings of A and B are replaced based on the descriptions in the present invention. Similarly, other comparisons, for example, 'A is less than B', 'A is greater than B', 'A is less than or equal to B', and 'A is greater than or equal to B', are all comparisons between results or values.

When the access network device allocates more than six resource blocks to low-complexity UE or coverage enhanced UE, $$2 \wedge \left\lceil \log_2 \left\lfloor \frac{N_{RB}^{UL}}{6} \right\rfloor \right\rceil * 11$$

states may be used to indicate resource allocation. In this case, an uplink resource may be allocated by using a resource block group as a granularity. For example, one resource block group includes three resource blocks. Because each narrowband includes six resource blocks, each narrowband includes two resource block groups. An uplink bandwidth has $$\left\lfloor \frac{N_{RB}^{UL}}{6} \right\rfloor$$

narrowbands in total, and therefore has $$\left\lfloor \frac{N_{RB}^{UL}}{6} \right\rfloor * 2$$

resource block groups in total. That is, the access network device allocates the resource blocks to the low-complexity UE or the coverage enhanced UE within all narrowbands included in the uplink bandwidth.

The access network device allocates more than six resource blocks to the low-complexity UE or the coverage enhanced UE, and therefore allocates at least three resource block groups when performing allocation by using a resource block group as a granularity. In addition, the access network device allocates a maximum of 25 resource blocks to the low-complexity UE or the coverage enhanced UE, and therefore the access network device allocates a maximum of eight resource block groups. In consideration that uplink resource allocation needs to meet a condition that a quantity of allocated RBs is a product based on three factors: 2, 3, and 5, the access network device cannot allocate 21 resource blocks to the terminal device, namely, the access network device cannot allocate seven resource block groups to the terminal device.

When an uplink resource is allocated by using a resource block group as a granularity, the access network device indicates a quantity of allocated resource groups and a location of an allocated starting resource group to the terminal device. Table 2 shows a quantity of narrowbands included in each type of uplink bandwidth and a total quantity of resource block groups included in each type of uplink bandwidth when there are uplink bandwidths of 15 RBs, 25 RBs, 50 RBs, 75 RBs, and 100 RBs. It should be noted that an uplink bandwidth of six RBs includes only one narrowband. Therefore, resource allocation in an uplink bandwidth of 1.4 MHz is completely based on a resource allocation method in the Rel-13 DCI format 6-0A.

TABLE 2

Quantity of narrowbands included in each type of uplink bandwidth and a total quantity of resource block groups included in each type of uplink bandwidth

|  | 15 RBs | 25 RBs | 50 RBs | 75 RBs | 100 RBs |
|---|---|---|---|---|---|
| Total quantity of narrowbands included in an uplink bandwidth | 2 | 4 | 8 | 12 | 16 |
| Total quantity of resource block groups | 4 | 8 | 16 | 24 | 32 |

Table 3 shows a total quantity of all starting resource group indexes at each quantity of resource groups in each type of uplink bandwidth.

TABLE 3

Total quantity of all starting resource group indexes at each quantity of resource groups

| Quantity of allocated resource block groups | 15 RBs | 25 RBs | 50 RBs | 75 RBs | 100 RBs |
|---|---|---|---|---|---|
| 3 | 2 | 6 | 14 | 22 | 30 |
| 4 | 1 | 5 | 13 | 21 | 29 |
| 5 |  | 4 | 12 | 20 | 28 |
| 6 |  | 3 | 11 | 19 | 27 |
| 8 |  | 1 | 9 | 17 | 25 |

Table 4 shows a total quantity of combinations (or all possibilities) when resource allocation is performed in each type of uplink bandwidth by using a resource group as a granularity. Table 4 also shows a total quantity of unused states in each type of uplink bandwidth. Apparently, the total quantity of unused states is greater than the total quantity of combinations. That is, the five least significant bits of the resource block allocation field and the $$\left\lceil \log_2 \left\lfloor \frac{N_{RB}^{UL}}{6} \right\rfloor \right\rceil$$

most significant bits of the resource block allocation field may be used to indicate resource allocation performed by using a resource block group as a granularity.

TABLE 4

|  | 15 RBs | 25 RBs | 50 RBs | 75 RBs | 100 RBs |
|---|---|---|---|---|---|
| Total quantity of combinations | 3 | 19 | 59 | 99 | 139 |
| Total quantity of unused states: $\left\lceil \log_2 \left\lfloor \frac{N_{RB}^{UL}}{6} \right\rfloor \right\rceil_{*11}$ | 22 | 44 | 88 | 176 | 176 |

The access network device indicates a resource indication value to the terminal device by using the resource block allocation field. Therefore, there is a problem how the access network device determines the resource indication value based on the determined quantity of resource block groups and the determined index of the starting resource block group, and indicates the resource indication value by using the $$\left\lceil \log_2 \left\lfloor \frac{N_{RB}^{UL}}{6} \right\rfloor \right\rceil + 5 \text{ bits}$$

of the resource block allocation field.

There is further a problem how the UE receiving the resource block allocation field determines the resource indication value based on the received resource block allocation field, and can easily determine, based on the resource indication value, the quantity of resource block groups allocated by the access network device and the index of the starting resource block group allocated by the access network device.

In an optional embodiment, the access network device further determines a second resource indication value. When ($L_{CRBGs}$−1)≤(M/2), the second resource indication value is equal to $(2N_{RBG}-K)(L_{CRBGs}-3)+RBG_{START}$. Otherwise, the second resource indication value is equal to $(2N_{RBG}-K)(M-L_{CRBGs}+1)-RBG_{START}-1$. Alternatively, when $(L_{CRBGs}-1)>(M/2)$, the second resource indication value is equal to $(2N_{RBG}-K)(L_{CRBGs}-3)+RBG_{START}$.

$N_{RBG}$ is a quantity of resource block groups included in all narrowbands of an uplink bandwidth, a value of $N_{RBG}$ is equal to $$2*\left\lfloor\frac{N_{RB}^{UL}}{6}\right\rfloor,$$

$L_{CRBGs}$ is the quantity of resource block groups allocated by the access network device, and $RBG_{START}$ is the index of the starting resource block group allocated by the access network device.

Optionally, when the uplink bandwidth is 25 RBs, 50 RBs, 75 RBs, or 100 RBs, K=9 and M=8; and/or when the uplink bandwidth is 15 RBs, K=5 and M=4.

Optionally, the first resource indication value and the second resource indication value are a same parameter, and/or the first resource indication value is equal to the second resource indication value.

Optionally, a decimal value indicated by the $$\left\lceil\log_2\left\lfloor\frac{N_{RB}^{UL}}{6}\right\rfloor\right\rceil$$

most significant bits of the resource block allocation field is floor(first resource indication value/11), where floor( ) is a round down function; and a decimal value indicated by the five least significant bits of the resource block allocation field is (first resource indication value mod 11)+21, where mod indicates a modulo operation.

Optionally, the first resource indication value is equal to:

floor(second resource indication value/11)*32+(second resource indication value mod 11)+21.

Optionally, the $$\left\lceil\log_2\left\lfloor\frac{N_{RB}^{UL}}{6}\right\rfloor\right\rceil+5 \text{ bits}$$

of the resource block allocation field jointly indicate the first resource indication value.

Optionally, when the uplink bandwidth is greater than 15 RBs:

second resource indication values corresponding to $L_{CRBGs}=3$ are numbered, and the second resource indication values corresponding to $L_{CRBGs}=3$ are numbered in ascending order based on $0+RBG_{START}$;

second resource indication values corresponding to $L_{CRBGs}=8$ are numbered, and the second resource indication values corresponding to $L_{CRBGs}=8$ are numbered in descending order based on $(2N_{RBG}-9)-RBG_{START}-1$;

second resource indication values corresponding to $L_{CRBGs}=4$ are numbered, and the second resource indication values corresponding to $L_{CRBGs}=4$ are numbered in ascending order based on $(2N_{RBG}-9)+RBG_{START}$;

second resource indication values corresponding to $L_{CRBGs}=5$ are numbered, and the second resource indication values corresponding to $L_{CRBGs}=5$ are numbered in ascending order based on $3*(2N_{RBG}-9)+RBG_{START}$; or second resource indication values corresponding to $L_{CRBGs}=6$ are numbered, and the second resource indication values corresponding to $L_{CRBGs}=6$ are numbered in descending order based on $3*(2N_{RBG}-9)-RBG_{START}-1$.

Optionally, when the uplink bandwidth is equal to 15 RBs:

second resource indication values corresponding to $L_{CRBGs}=3$ are numbered, and the second resource indication values corresponding to $L_{CRBGs}=3$ are numbered in ascending order based on $0+RBG_{START}$; or second resource indication values corresponding to $L_{CRBGs}=4$ are numbered, and the second resource indication values corresponding to $L_{CRBGs}=4$ are numbered in descending order based on $(2N_{RBG}-5)-RBG_{START}-1$.

Optionally, the quantity of resource block groups allocated to the terminal device and the index of the starting resource block group allocated to the terminal device are determined; and a first parameter value is determined based on the determined quantity of resource block groups.

A second resource indication value is equal to: determined first parameter value+index of the starting resource block group.

Optionally, the determining a first parameter value based on the determined quantity of resource block groups includes: when three resource block groups are allocated to the terminal device, the first parameter value is equal to 0.

Optionally, the determining a first parameter value based on the determined quantity of resource block groups includes: when four resource block groups are allocated to the terminal device:

when an uplink bandwidth is 15 RBs, the first parameter value is equal to 2;

when an uplink bandwidth is 25 RBs, the first parameter value is equal to 7;

when an uplink bandwidth is 50 RBs, the first parameter value is equal to 23;

when an uplink bandwidth is 75 RBs, the first parameter value is equal to 39; or when an uplink bandwidth is 100 RBs, the first parameter value is equal to 55.

Optionally, the determining a first parameter value based on the determined quantity of resource block groups includes: when five resource block groups are allocated to the terminal device:

when an uplink bandwidth is 25 RBs, the first parameter value is equal to 14;

when an uplink bandwidth is 50 RBs, the first parameter value is equal to 46;

when an uplink bandwidth is 75 RBs, the first parameter value is equal to 78; or when an uplink bandwidth is 100 RBs, the first parameter value is equal to 110.

Optionally, the determining a first parameter value based on the determined quantity of resource block groups includes: when six resource block groups are allocated to the terminal device:

when an uplink bandwidth is 25 RBs, the first parameter value is equal to 18;

when an uplink bandwidth is 50 RBs, the first parameter value is equal to 58;

when an uplink bandwidth is 75 RBs, the first parameter value is equal to 98; or when an uplink bandwidth is 100 RBs, the first parameter value is equal to 138.

Optionally, the determining a first parameter value based on the determined quantity of resource block groups includes: when eight resource block groups are allocated to the terminal device:

when an uplink bandwidth is 25 RBs, the first parameter value is equal to 6;

when an uplink bandwidth is 50 RBs, the first parameter value is equal to 14;

when an uplink bandwidth is 75 RBs, the first parameter value is equal to 22; or when an uplink bandwidth is 100 RBs, the first parameter value is equal to 30.

Optionally, the determining a first parameter value based on the determined quantity of resource block groups includes: when an uplink bandwidth is equal to N*25 RBs, and N is a positive integer:

when four resource block groups are allocated to the terminal device, the first parameter value is equal to 7+(N−1)*16; or when five resource block groups are allocated to the terminal device, the first parameter value is equal to 14+(N−1)*30; when six resource block groups are allocated to the terminal device, the first parameter value is equal to 18+(N−1)*40; or when eight resource block groups are allocated to the terminal device, the first parameter value is equal to 6+(N−1)*8.

The following provides a method for numbering second resource indication values and a method for determining a second resource indication value that are determined by the access network device. The access network device or a system predetermines a method for numbering second resource indication values. The access network device or the system predetermines a method for determining a second resource indication value.

Method 1 for Numbering Second Resource Indication Values:

When an uplink bandwidth is greater than 15 RBs:

second resource indication values corresponding to $L_{CRBGs}=3$ are numbered, and the second resource indication values corresponding to $L_{CRBGs}=3$ are numbered in ascending order based on $0+RBG_{START}$;

second resource indication values corresponding to $L_{CRBGs}=8$ are numbered, and the second resource indication values corresponding to $L_{CRBGs}=8$ are numbered in descending order based on $(2N_{RBG}-9)-RBG_{START}-1$;

second resource indication values corresponding to $L_{CRBGs}=4$ are numbered, and the second resource indication values corresponding to $L_{CRBGs}=4$ are numbered in ascending order based on $(2N_{RBG}-9)+RBG_{START}$;

second resource indication values corresponding to $L_{CRBGs}=5$ are numbered, and the second resource indication values corresponding to $L_{CRBGs}=5$ are numbered in ascending order based on $3*(2N_{RBG}-9)+RBG_{START}$; or second resource indication values corresponding to $L_{CRBGs}=6$ are numbered, and the second resource indication values corresponding to $L_{CRBGs}=6$ are numbered in descending order based on $3*(2N_{RBG}-9)-RBG_{START}-1$.

$N_{RBG}$ is a quantity of resource block groups included in all narrowbands of the uplink bandwidth, a value of $N_{RBG}$ is equal to $$2*\left\lfloor\frac{N_{RB}^{UL}}{6}\right\rfloor,$$

$L_{CRBGs}$ is a quantity of resource block groups allocated by the access network device, and $RBG_{START}$ is an index of a starting resource block group allocated by the access network device.

Method 2 for Numbering Second Resource Indication Values:

Although the access network device cannot allocate seven resource block groups to the UE, a case of seven resource block groups may be considered when numbers of second resource indication values are determined. When an uplink bandwidth is 25 RBs, 50 RBs, 75 RBs, or 100 RBs, in a particular uplink bandwidth:

Quantity of combinations of three resource groups+Quantity of combinations of eight resource groups=

Quantity of combinations of four resource groups+Quantity of combinations of seven resource groups=

Quantity of combinations of five resource groups+Quantity of combinations of six resource groups.

It is assumed that Quantity of combinations of three resource groups+Quantity of combinations of eight resource groups=D. In addition, it is assumed that a total quantity of resource indication values corresponding to three resource groups, a total quantity of resource indication values corresponding to four resource groups, and a total quantity of resource indication values corresponding to five resource groups are X1, X2, and X3, respectively. The following table shows a method for numbering second resource indication values. That is, in an order of $L_{CRBGs}=3$, $L_{CRBGs}=8$, $L_{CRBGs}=4$, $L_{CRBGs}=7$, $L_{CRBGs}=5$, $L_{CRBGs}=6$, second resource indication values are numbered by sequentially numbering all starting resource group indexes corresponding to each $L_{CRBGs}$. Herein, $L_{CRBGs}$ is a quantity of consecutive resource groups allocated by the access network device to the UE.

TABLE

| Method 2 for numbering second resource indication values | |
|---|---|
| Second resource indication value | |
| 0 to D-1 | Second resource indication values corresponding to three resource groups: 0 to (X1-1) |
| | Second resource indication values corresponding to eight resource groups: X1 to D-1 |
| D to 2D-1 | Second resource indication values corresponding to four resource groups: D to D + (X2-1) |
| | Second resource indication values corresponding to seven resource groups: D + X2 to 2D-1 |
| 2D to 3D-1 | Second resource indication values corresponding to five resource groups: 2D to 2D + (X3-1) |
| | Second resource indication values corresponding to six resource groups: 2D + X3 to 3D-1 |

Method 3 for Numbering Second Resource Indication Values:

When an uplink bandwidth is 15 RBs, in an order of $L_{CRBGs}=3$, $L_{CRBGs}=4$, second resource indication values are numbered by numbering, in ascending order, all starting resource group indexes corresponding to each $L_{CRBGs}$.

When an uplink bandwidth is 25 RBs, 50 RBs, 75 RBs, or 100 RBs, in an order of $L_{CRBGs}=3$, $L_{CRBGs}=4$, $L_{CRBGs}=5$, $L_{CRBGs}=6$, $L_{CRBGs}=7$, $L_{CRBGs}=8$, second resource indication values are numbered by numbering, in ascending order, all starting resource group indexes corresponding to each $L_{CRBGs}$.

$L_{CRBGs}$ is a quantity of consecutive resource groups allocated by the access network device to the UE.

The method for determining a second resource indication value is related to the method for numbering second resource indication values. It should be noted that the following formulas are merely examples. Any formula variation or example formula used to obtain a same result fall within the protection scope of embodiments of the present invention. That is, a value of a second resource indication value is the same as a result calculated by using the following formula.

Method 1 for Determining a Second Resource Indication Value:

Method 1 for numbering second resource indication values is used.

If $(L_{CRBGs}-1) \leq (M/2)$, the second resource indication value is equal to $(2N_{RBG}-K)(L_{CRBGs}-3)+RBG_{START}$.

Otherwise, the second resource indication value is equal to $(2N_{RBG}-K)(M-L_{CRBGs}+1)-RBG_{START}-1$.

Herein, a value of $N_{RBG}$ is equal to $$2 * \left\lfloor \frac{N_{RB}^{UL}}{6} \right\rfloor,$$

$L_{CRBGs}$ is a quantity of resource block groups allocated by the access network device, and $RBG_{START}$ is an index of a starting resource block group allocated by the access network device.

Optionally, when an uplink bandwidth is 25 RBs, 50 RBs, 75 RBs, or 100 RBs, K=9 and M=8.

Optionally, when an uplink bandwidth is 15 RBs, K=5 and M=4.

Method 2 for Determining a Second Resource Indication Value:

Method 1 for numbering second resource indication values is used.

If $L_{CRBGs}=3$, $L_{CRBGs}=4$, or $L_{CRBGs}=5$, the second resource indication value is equal to: first parameter value+$RBG_{START}$.

If $L_{CRBGs}=6$, $L_{CRBGs}=7$, or $L_{CRBGs}=8$, the second resource indication value is equal to: first parameter value−$RBG_{START}$. The first parameter value is shown in the following table.

TABLE 7

| | First parameter value | | | | |
|---|---|---|---|---|---|
| | 15 RBs | 25 RBs | 50 RBs | 75 RBs | 100 RBs |
| $L_{CRBGs}=3$ | 0 | 0 | 0 | 0 | 0 |
| $L_{CRBGs}=4$ | 2 | 7 | 23 | 39 | 55 |
| $L_{CRBGs}=5$ | | 14 | 46 | 78 | 110 |
| $L_{CRBGs}=6$ | | 20 | 68 | 116 | 164 |
| $L_{CRBGs}=7$ | | 13 | 45 | 77 | 109 |
| $L_{CRBGs}=8$ | | 6 | 22 | 38 | 54 |

$L_{CRBGs}$ is a quantity of resource block groups allocated by the access network device, and $RBG_{START}$ is an index of a starting resource block group allocated by the access network device.

Method 3 for Determining a Second Resource Indication Value:

Method 2 for numbering second resource indication values is used.

For example, the access network device determines a first parameter value based on a determined quantity of resource block groups and an uplink bandwidth, and then determines a second resource indication value based on a sum of the determined first parameter value and an index of a starting resource block group.

Second resource indication value=First parameter value+Index of the starting resource block group.

The following table shows first parameter values corresponding to quantities of resource block groups in uplink bandwidths of 15 RBs, 25 RBs, 50 RBs, 75 RBs, and 100 RBs.

TABLE 8

| | First parameter value | | | | |
|---|---|---|---|---|---|
| | 15 RBs | 25 RBs | 50 RBs | 75 RBs | 100 RBs |
| $L_{CRBGs}=3$ | 0 | 0 | 0 | 0 | 0 |
| $L_{CRBGs}=4$ | 2 | 7 | 23 | 39 | 55 |
| $L_{CRBGs}=5$ | | 14 | 46 | 78 | 110 |
| $L_{CRBGs}=6$ | | 18 | 58 | 98 | 138 |
| $L_{CRBGs}=8$ | | 6 | 14 | 22 | 30 |

$L_{CRBGs}$ is the quantity of resource block groups allocated by the access network device.

Method 4 for Determining a Second Resource Indication Value:

Method 2 for numbering second resource indication values is used.

For example, the access network device determines a first parameter value based on a determined quantity of resource block groups and an uplink bandwidth, and then determines a second resource indication value based on a sum of the determined first parameter value and an index of a starting resource block group.

Second resource indication value=First parameter value+Index of the starting resource block group.

When the uplink bandwidth is equal to N*25 RBs, N is a positive integer greater than or equal to 1, and a value of N is 1, 2, 3, or 4:

when four resource block groups are allocated to the terminal device, the first parameter value is equal to 7+(N−1)*16;

when five resource block groups are allocated to the terminal device, the first parameter value is equal to 14+(N−1)*30;

when six resource block groups are allocated to the terminal device, the first parameter value is equal to 18+(N−1)*40; or when eight resource block groups are allocated to the terminal device, the first parameter value is equal to 6+(N−1)*8.

Method 5 for Determining a Second Resource Indication Value:

Method 3 for numbering second resource indication values is used.

Table 5 shows another method for determining a second resource indication value.

TABLE 5

Method 5 for determining a second resource indication value

| $L_{CRBGs}$ | 3 | 4 | 5 | 6 | 8 |
|---|---|---|---|---|---|
| Second resource indication value | 0 + $RBG_{START}$ | X1 + $RBG_{START}$ | X1 + X2 + $RBG_{START}$ | X1 + X2 + X3 + $RBG_{START}$ | X1 + X2 + X3 + X4 + $RBG_{START}$ |

$RBG_{START}$ is a starting resource group index. X1 indicates all starting resource group indexes corresponding to $L_{CRBGs}=3$. X2 indicates all starting resource group indexes corresponding to $L_{CRBGs}=4$. X3 indicates all starting resource group indexes corresponding to $L_{CRBGs}=5$. X4 indicates all starting resource group indexes corresponding to $L_{CRBGs}=6$.

It should be noted that after the access network device determines the second resource indication value by using the foregoing method:

If the first resource indication value is equal to: floor (second resource indication value/11)*32+(second resource indication value mod 11)+21, the $$\left\lceil \log_2 \left\lceil \frac{N_{RB}^{UL}}{6} \right\rceil \right\rceil + 5 \text{ bits}$$

of the resource block allocation field jointly indicate the first resource indication value, where floor( ) is a round down function. The "jointly indicate" in the present invention means that the $$\left\lceil \log_2 \left\lceil \frac{N_{RB}^{UL}}{6} \right\rceil \right\rceil + 5 \text{ bits}$$

are jointly used as one binary string, and a range of a decimal value indicated by this binary bit string is 0 to $$2 \wedge \left( \left\lceil \log_2 \left\lceil \frac{N_{RB}^{UL}}{6} \right\rceil \right\rceil + 5 \right) - 1.$$

If the first resource indication value is equal to the second resource indication value, a decimal value indicated by the $$\left\lceil \log_2 \left\lceil \frac{N_{RB}^{UL}}{6} \right\rceil \right\rceil$$

most significant bits of the resource block allocation field is floor(first resource indication value/11), where floor( ) is a round down function; and a decimal value indicated by the five least significant bits of the resource block allocation field is (first resource indication value mod 11)+21, where mod indicates a modulo operation.

In this embodiment, the terminal device needs to determine, based on a received resource allocation field, a resource allocated by the access network device, and send a PUSCH on the allocated resource.

The terminal device obtains a resource block allocation field in downlink control information, where a size of the resource block allocation field is $$\left\lceil \log_2 \left\lceil \frac{N_{RB}^{UL}}{6} \right\rceil \right\rceil + 5 \text{ bits},$$

and $N_{RB}^{UL}$ is an uplink bandwidth configuration.

When a value indicated by five least significant bits of the resource block allocation field is less than or equal to 20, $$\left\lceil \log_2 \left\lceil \frac{N_{RB}^{UL}}{6} \right\rceil \right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the terminal device determines a first resource indication value indicated by the resource block allocation field.

The terminal device determines, based on the first resource indication value, a quantity of resource block groups allocated to the terminal device and an index of a starting resource block group allocated to the terminal device, where the quantity of allocated resource block groups is greater than or equal to 3 and is less than or equal to 8, and one resource block group includes three resource blocks.

The terminal device determines at least one resource block allocated to the terminal device, and sends a PUSCH on the allocated at least one resource block.

Optionally, a decimal value indicated by the $$\left\lceil \log_2 \left\lceil \frac{N_{RB}^{UL}}{6} \right\rceil \right\rceil$$

most significant bits of the resource block allocation field is a second parameter value, and a decimal value indicated by the five least significant bits of the resource block allocation field is a third parameter value. The first resource indication value is equal to: second parameter value*11+third parameter value−21.

Optionally, the terminal device determines a second resource indication value. The second resource indication value and the first resource indication value are a same parameter, and the second resource indication value is equal to the first resource indication value.

Optionally, the first resource indication value is a decimal value jointly indicated by the $$\left\lceil \log_2 \left\lceil \frac{N_{RB}^{UL}}{6} \right\rceil \right\rceil + 5 \text{ bits.}$$

Optionally, the terminal device determines a second resource indication value. The second resource indication value is equal to:

{(first resource indication value−fourth parameter value)*11}/32+fourth parameter value.

The fourth parameter value is equal to: (fourth resource indication value mod 11)+21.

Optionally, if the second resource indication value is less than $(2N_{RBG}-K)*I+(N_{RBG}-2-I)$, it is determined that the quantity of resource block groups allocated to the terminal device is equal to I+3. Otherwise, it is determined that the quantity of resource block groups allocated to the terminal device is equal to M–I. $N_{RBG}$ is a quantity of resource block groups included in all narrowbands of an uplink bandwidth, a value of $N_{RBG}$ is equal to $$2*\left\lfloor \frac{N_{RB}^{UL}}{6} \right\rfloor,$$

I=floor{second resource indication value/$(2N_{RBG}-K)$}, and floor( ) is a round down function.

Optionally, if the second resource indication value is less than $(2N_{RBG}-K)*F(N_{RBG}-2-I)$, it is determined that a value of the index of the starting resource block group allocated to the terminal device is equal to {second resource indication value−$(2N_{RBG}-K)*I$}. Otherwise, it is determined that a value of the index of the starting resource block group allocated to the terminal device is equal to {$(2N_{RBG}-K)*(I+1)$−second resource indication value−1}.

Optionally, when the uplink bandwidth is 25 RBs, 50 RBs, 75 RBs, or 100 RBs, K=9 and M=8. When the uplink bandwidth is 15 RBs, K=5 and M=4.

Optionally, when the uplink bandwidth is greater than 15 RBs, the UE parses the second resource indication value in the following manner of numbering second resource indication values:

numbering second resource indication values corresponding to $L_{CRBGs}=3$, where the second resource indication values corresponding to $L_{CRBGs}=3$ are numbered in ascending order based on $0+RBG_{START}$;

numbering second resource indication values corresponding to $L_{CRBGs}=8$, where the second resource indication values corresponding to $L_{CRBGs}=8$ are numbered in descending order based on $(2N_{RBG}-9)-RBG_{START}-1$;

numbering second resource indication values corresponding to $L_{CRBGs}=4$, where the second resource indication values corresponding to $L_{CRBGs}=4$ are numbered in ascending order based on $(2N_{RBG}-9)+RBG_{START}$;

numbering second resource indication values corresponding to $L_{CRBGs}=5$, where the second resource indication values corresponding to $L_{CRBGs}=5$ are numbered in ascending order based on $3*(2N_{RBG}-9)+RBG_{START}$; or numbering second resource indication values corresponding to $L_{CRBGs}=6$, where the second resource indication values corresponding to $L_{CRBGs}=6$ are numbered in descending order based on $3*(2N_{RBG}-9)-RBG_{START}-1$.

$L_{CRBGs}$ is the quantity of resource block groups allocated by the access network device, and $RBG_{START}$ is the index of the starting resource block group allocated by the access network device.

Optionally, when the uplink bandwidth is equal to 15 RBs, the UE (namely, the terminal device) parses the second resource indication value in the following manner of numbering second resource indication values:

numbering second resource indication values corresponding to $L_{CRBGs}=3$, where the second resource indication values corresponding to $L_{CRBGs}=3$ are numbered in ascending order based on $0+RBG_{START}$; or numbering second resource indication values corresponding to $L_{CRBGs}=4$, where the second resource indication values corresponding to $L_{CRBGs}=4$ are numbered in descending order based on $(2N_{RBG}-5)-RBG_{START}-1$.

$L_{CRBGs}$ is the quantity of resource block groups allocated by the access network device, and $RBG_{START}$ is the index of the starting resource block group allocated by the access network device.

Optionally, if the second resource indication value is less than a first threshold, the terminal device determines that the quantity of resource block groups allocated to the terminal device is equal to I+3, and a value of the index of the starting resource block group allocated to the terminal device is equal to: second resource indication value−D*I. If the second resource indication value is greater than or equal to a first threshold, the terminal device determines that the quantity of resource block groups allocated to the terminal device is equal to K−I, and a value of the index of the starting resource block group allocated to the terminal device is equal to: second resource indication value−{$(N_{RBG}-2)-I+D*I$}.

A value of I is equal to: floor(second resource indication value/D), the first threshold is equal to {$(N_{RBG}-2)-I+D*I$}, a value of $N_{RBG}$ is equal to $$2*\left\lfloor \frac{N_{RB}^{UL}}{6} \right\rfloor,$$

and floor( ) is a round down function.

Optionally, when the uplink bandwidth is equal to 15 RBs, D=3 and K=4. When the uplink bandwidth is greater than 15 RBs, $D=2N_{RBG}-9$ and K=8.

The following provides a specific method for determining, by a terminal device according to a resource block allocation field in downlink control information, a resource allocated by an access network device. A size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration.

When a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate a resource that is allocated within the indicated narrowband by using an uplink resource allocation type 0.

When a value indicated by five least significant bits of the resource block allocation field is greater than 20, a first resource indication value indicated by the resource block allocation field is determined. A quantity of resource block groups allocated by the access network device to the terminal device and an index of a starting resource block group allocated by the access network device to the terminal device are determined based on the first resource indication value. The quantity of allocated resource block groups is greater than or equal to 3 and is less than or equal to 8, and one resource block group includes three resource blocks.

At least one resource block allocated by the access network device to the terminal device are determined based on the determined quantity of resource block groups and the determined index of the starting resource block group, and a PUSCH is sent on the allocated at least one resource block.

The UE determines the first resource indication value in the following Manner 1 or Manner 2. It should be noted that the UE can use only Manner 1 to determine the first resource indication value, or can use only Manner 2 to determine the first resource indication value, rather than selecting either Manner 1 or Manner 2 to determine the first resource indication value.

Manner 1 of Determining the First Resource Indication Value by the UE:

The terminal device determines the first resource indication value indicated by the resource block allocation field. A decimal value indicated by the $$\left\lceil \log_2 \left\lfloor \frac{N_{RB}^{UL}}{6} \right\rfloor \right\rceil$$

most significant bits of the resource block allocation field is a second parameter value, and a decimal value indicated by the five least significant bits of the resource block allocation field is a third parameter value. First resource indication value=Second parameter value*11+Third parameter value−21.

Manner 2 of Determining the First Resource Indication Value by the UE:

The first resource indication value is equal to a decimal value jointly indicated by the $$\left\lceil \log_2 \left\lfloor \frac{N_{RB}^{UL}}{6} \right\rfloor \right\rceil + 5 \text{ bits.}$$

The UE determines, based on the first resource indication value, the quantity of resource block groups allocated by the access network device to the terminal device and the index of the starting resource block group allocated by the access network device to the terminal device.

If the UE determines the first resource indication value in Manner 1, the first resource indication value is equal to a second resource indication value. In this case, the first resource indication value and the second resource indication value may be a same parameter.

If the UE determines the first resource indication value in Manner 2, the UE needs to determine a second resource indication value based on the first resource indication value. The second resource indication value is equal to:

{(first resource indication value−fourth parameter value)*11}/32+fourth parameter value.

The first resource indication value is a decimal value jointly indicated by the $$\left\lceil \log_2 \left\lfloor \frac{N_{RB}^{UL}}{6} \right\rfloor \right\rceil + 5 \text{ bits.}$$

The fourth parameter value is equal to: (first resource indication value mod 11)+21.

The UE determines, based on the second resource indication value, the quantity of resource block groups allocated by the access network device to the terminal device and the index of the starting resource block group allocated by the access network device to the terminal device. The UE determines, by using one of the following methods, the quantity of resource block groups allocated by the access network device to the terminal device and the index of the starting resource block group allocated by the access network device to the terminal device.

Method 1:

A system (or the access network device) determines the second resource indication value by using the foregoing Method 1, or determines the second resource indication value by using the foregoing Method 2.

The determining the quantity of resource block groups allocated by the access network device to the terminal device includes:

if the second resource indication value is less than $(2N_{RBG}-K)*F(N_{RBG}-2-I)$, determining that the quantity of resource block groups allocated to the terminal device is equal to I+3; or otherwise, determining that the quantity of resource block groups allocated to the terminal device is equal to M−I, where I=floor{second resource indication value/($2N_{RBG}-K$)}, floor( ) is a round down function, $N_{RBG}$ is a quantity of resource block groups included in all narrowbands of an uplink bandwidth, and a value of $N_{RBG}$ is equal to $$2 * \left\lfloor \frac{N_{RB}^{UL}}{6} \right\rfloor.$$

Optionally, when the uplink bandwidth is 25 RBs, 50 RBs, 75 RBs, or 100 RBs, K=9 and M=8.

Optionally, when the uplink bandwidth is 15 RBs, K=5 and M=4.

The determining the index of the starting resource block group allocated by the access network device to the terminal device includes:

if the second resource indication value is less than $(2N_{RBG}-K)*I+(N_{RBG}-2-I)$, determining that a value of the index of the starting resource block group allocated to the terminal device is equal to {second resource indication value−($2N_{RBG}-K$)*I}; or otherwise, determining that a value of the index of the starting resource block group allocated to the terminal device is equal to {($2N_{RBG}-K$)*(I+1)−second resource indication value−1}, where I=floor{second resource indication value/($2N_{RBG}-K$)}, floor( ) is a round down function, $N_{RBG}$ is a quantity of resource block groups included in all narrowbands of an uplink bandwidth, and a value of $N_{RBG}$ is equal to $$2 * \left\lfloor \frac{N_{RB}^{UL}}{6} \right\rfloor.$$

Optionally, when the uplink bandwidth is 25 RBs, 50 RBs, 75 RBs, or 100 RBs, K=9.

Optionally, when the uplink bandwidth is 15 RBs, K=5.

Method 2:

A system (or the access network device) uses the foregoing Method 3 for determining a second resource indication value, or uses the foregoing Method 4 for determining a second resource indication value.

When an uplink bandwidth is 25 RBs, 50 RBs, 75 RBs, or 100 RBs, the determining the quantity of resource block groups allocated by the access network device to the terminal device includes:

after receiving a second resource indication value, first determining, by the UE, a range within which the resource indication value falls, that is, determining, from three ranges [0, D−1], [D, 2D−1], and [2D, 3D−1], the range within which the resource indication value indicated by the resource block allocation field falls.

After determining the range, the UE determines a quantity of possible resource groups allocated by the access network device. For example, [0, D−1] is corresponding to three possible resource groups and eight possible resource groups, [D, 2D−1] is corresponding to four possible resource groups and seven possible resource groups, and [2D, 3D−1] is corresponding to five possible resource groups and six possible resource groups.

Further, the UE compares the resource indication value indicated by the access network device with one resource indication value threshold in the determined range, and determines, based on a comparison result, the quantity of resource groups allocated by the access network device. For example, [0, D−1] is corresponding to a resource indication value threshold X1, [D, 2D−1] is corresponding to a resource indication value threshold D+X2, and [2D, 2D−1] is corresponding to a resource indication value threshold 2D+X3.

$D=2N_{RBG}-9$. $N_{RBG}$ is a quantity of resource block groups included in all narrowbands of an uplink bandwidth, and a value of $N_{RBG}$ is equal to $$2*\left\lfloor\frac{N_{RB}^{UL}}{6}\right\rfloor.$$

The determining the index of the starting resource block group allocated by the access network device to the terminal device includes:

if the second resource indication value is less than a first threshold (or is less than or equal to the first threshold−1), determining that the quantity of resource block groups allocated to the terminal device is equal to I+3, and a value of the index of the starting resource block group allocated to the terminal device is equal to: second resource indication value−D*I; or if the second resource indication value is greater than or equal to a first threshold (or is greater than the first threshold−1), determining that the quantity of resource block groups allocated to the terminal device is equal to K−I, and a value of the index of the starting resource block group allocated to the terminal device is equal to: second resource indication value−{($N_{RBG}-2$)−I+D*I}.

A value of I is equal to: floor(second resource indication value/D), and the first threshold is equal to {($N_{RBG}-2$)−I+D*I}. $N_{RBG}$ is a quantity of resource block groups included in all narrowbands of an uplink bandwidth, and a value of $N_{RBG}$ is equal to $$2*\left\lfloor\frac{N_{RB}^{UL}}{6}\right\rfloor.$$

$D=2N_{RBG}-9$.

When the uplink bandwidth is 15 RBs, the UE determines $L_{CRBGs}$ and $RBG_{START}$ based on the following correspondences and the second resource indication value:

A second resource indication value 0 is corresponding to $L_{CRBGs}=3$ and $RBG_{START}=0$.

A second resource indication value 1 is corresponding to $L_{CRBGs}=3$ and $RBG_{START}=3$.

A second resource indication value 2 is corresponding to $L_{CRBGs}=4$ and $RBG_{START}=0$.

It should be noted that, in embodiments of the present invention, at least one resource block indicated by a resource allocation field are at least one resource block on which the UE sends a PUSCH. In some scenarios, at least one resource block on which the UE sends a PUSCH are at least one resource block obtained after resource blocks indicated by a resource allocation field are adjusted based on a pre-specification. Correspondingly, the access network device does not always receive a PUSCH on at least one resource block indicated by a resource allocation field. In some scenarios, at least one resource block on which the access network device receives a PUSCH are at least one resource block obtained after at least one resource block indicated by a resource allocation field are adjusted based on a pre-specification.

For example, for an uplink bandwidth of 15 RBs, 25 RBs, or 75 RBs, an RB in the center of the uplink bandwidth does not belong to any narrowband. If resource blocks indicated by a resource allocation field are located on both sides of the center RB, to ensure continuous PUSCH transmission, the center RB is also used for PUSCH transmission. However, a resource block that has a maximum (or minimum) index and that is indicated by the resource allocation field is not used for PUSCH transmission.

Figure 4:
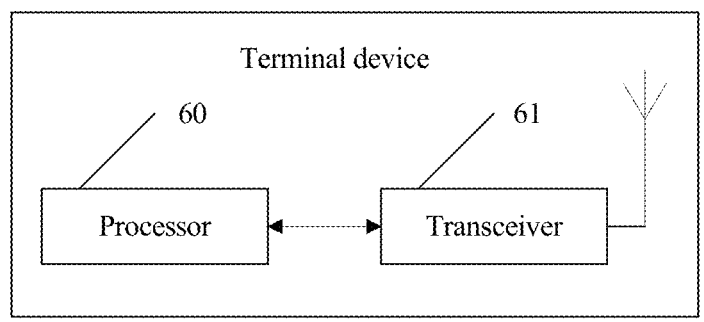
FIG. 4 is a schematic diagram of a first terminal device according to an embodiment of the present invention.

As shown in FIG. 4, a terminal device may include a processor and a transceiver. Certainly, the terminal device may further include a memory and the like. The terminal device is configured to perform the steps performed by the terminal device in the embodiments of the present invention.

The transceiver is configured to obtain a resource block allocation field in downlink control information, where a size of the resource block allocation field is $$\left\lceil \log_2\left\lfloor\frac{N_{RB}^{UL}}{6}\right\rfloor\right\rceil + 5 \text{ bits,}$$

and $N_{RB}^{UL}$ is an uplink bandwidth configuration.

When a value indicated by five least significant bits of the resource block allocation field is less than or equal to 20, $$\left\lceil \log_2\left\lfloor\frac{N_{RB}^{UL}}{6}\right\rfloor\right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the resource block allocation field indicates a first resource indication value.

The processor is configured to determine, based on the first resource indication value, a quantity of resource block groups allocated to the terminal device and an index of a starting resource block group allocated to the terminal device, where the quantity of allocated resource block groups is greater than or equal to 3 and is less than or equal to 8, and one resource block group includes three resource blocks.

The processor is configured to determine at least one resource block allocated to the terminal device.

Optionally, the transceiver is further configured to send a PUSCH on the allocated at least one resource block.

To implement the foregoing embodiments, an embodiment of the present invention further provides another terminal device. It should be noted that the terminal device can perform the method in the foregoing embodiments. Therefore, for details of the terminal device, refer to the descriptions in the foregoing embodiments. For brevity, same content is not described again below.

Figure 5:
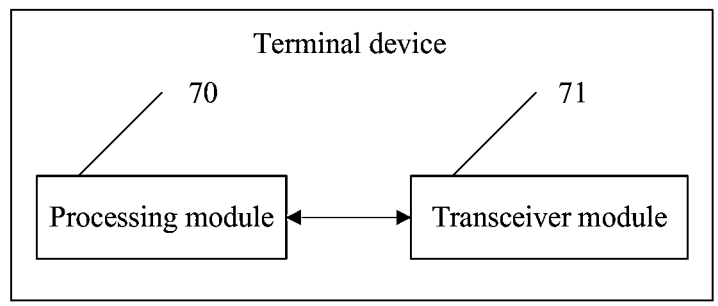
FIG. 5 is a schematic diagram of a second terminal device according to an embodiment of the present invention.

As shown in FIG. 5, the terminal device may include a processing module and a transceiver module. Certainly, the terminal device may further include a storage module and the like. The terminal device is configured to perform the steps performed by the terminal device in the embodiments of the present invention.

The transceiver module is configured to obtain a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration.

When a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the resource block allocation field indicates a first resource indication value.

The processing module is configured to determine, based on the first resource indication value, a quantity of resource block groups allocated to the terminal device and an index of a starting resource block group allocated to the terminal device, where the quantity of allocated resource block groups is greater than or equal to 3 and is less than or equal to 8, and one resource block group includes three resource blocks.

The processing module is configured to determine at least one resource block allocated to the terminal device.

Optionally, the transceiver module is further configured to send a PUSCH on the allocated at least one resource block.

It should be noted that, for a specific implementation in which the terminal device receives the downlink control information and determines, based on the downlink control information, a resource allocated by an access network device to the terminal device, refer to the descriptions in the method embodiments. This terminal device embodiment and the foregoing method embodiments are based on a same concept, and this terminal device embodiment brings a same technical effect as the method embodiments of the present invention. For specific content, refer to the descriptions in the method embodiments of the present invention. Details are not described herein again.

To implement the foregoing embodiments, an embodiment of the present invention further provides an access network device. It should be noted that the access network device can perform the method in the foregoing embodiments. Therefore, for details of the access network device, refer to the descriptions in the foregoing embodiments. For brevity, same content is not described again below.

Figure 6:
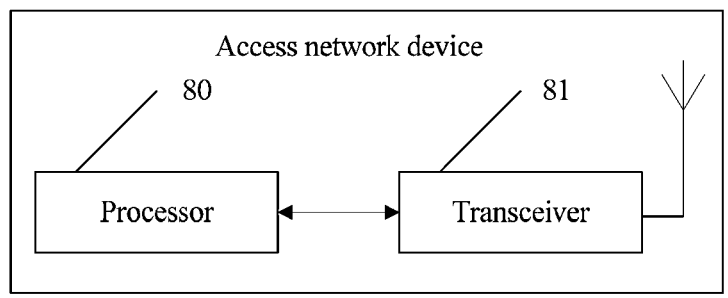
FIG. 6 is a schematic diagram of a first access network device according to an embodiment of the present invention.

As shown in FIG. 6, the access network device may include a processor and a transceiver. Certainly, the access network device may further include a memory and the like. The access network device is configured to perform the steps performed by the access network device in the embodiments of the present invention.

The processor is configured to determine a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration or a quantity of RBs included in an uplink system bandwidth.

When a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the resource block allocation field indicates a first resource indication value, where the first resource indication value indicates a quantity of resource block groups allocated to a terminal device and an index of a starting resource block group allocated to the terminal device, the quantity of allocated resource block groups is greater than or equal to 3 and is less than or equal to 8, and one resource block group includes three resource blocks.

The transceiver is configured to send the downlink control information to the terminal device.

Optionally, the transceiver is further configured to receive, on at least one resource block (RB) allocated to the terminal device, a physical uplink shared channel (PUSCH) sent by the terminal device.

To implement the foregoing embodiments, an embodiment of the present invention further provides another access network device. It should be noted that the access network device can perform the method in the foregoing embodiments. Therefore, for details of the access network device, refer to the descriptions in the foregoing embodiments. For brevity, same content is not described again below.

Figure 7:
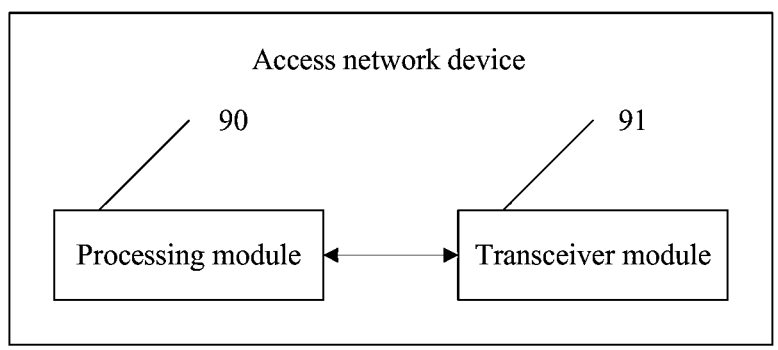
FIG. 7 is a schematic diagram of a second access network device according to an embodiment of the present invention.

As shown in FIG. 7, the access network device may include a processing module and a transceiver module. Certainly, the access network device may further include a storage module and the like. The access network device is configured to perform the steps performed by the access network device in the embodiments of the present invention.

The processing module is configured to determine a resource block allocation field in downlink control information, where a size of the resource block allocation field is $$\left\lceil \log_2 \left\lfloor \frac{N_{RB}^{UL}}{6} \right\rfloor \right\rceil + 5 \text{ bits,}$$

and $N_{RB}^{UL}$ is an uplink bandwidth configuration or a quantity of RBs included in an uplink system bandwidth.

When a value indicated by five least significant bits of the resource block allocation field is less than or equal to 20, $$\left\lceil \log_2 \left\lfloor \frac{N_{RB}^{UL}}{6} \right\rfloor \right\rceil$$

most significant bits of the resource block allocation field indicate a narrowband, and the five least significant bits of the resource block allocation field indicate that a resource is allocated within the indicated narrowband by using an uplink resource allocation type 0.

When a value indicated by five least significant bits of the resource block allocation field is greater than 20, the resource block allocation field indicates a first resource indication value, where the first resource indication value indicates a quantity of resource block groups allocated to a terminal device and an index of a starting resource block group allocated to the terminal device, the quantity of allocated resource block groups is greater than or equal to 3 and is less than or equal to 8, and one resource block group includes three resource blocks.

The transceiver module is configured to send the downlink control information to the terminal device.

Optionally, the transceiver module is further configured to receive, on at least one resource block (RB) allocated to the terminal device, a physical uplink shared channel (PUSCH) sent by the terminal device.

It should be noted that, for a specific implementation in which the access network device determines the resource block allocation field in the downlink control information and sends the downlink control information to the terminal device, to flexibly allocate a resource, refer to the descriptions in the method embodiments. This access network device embodiment and the foregoing method embodiments are based on a same concept, and this access network device embodiment brings a same technical effect as the method embodiments of the present invention. For specific content, refer to the descriptions in the method embodiments of the present invention. Details are not described herein again.

It should be noted that the processor in all the foregoing embodiments of the present invention may be a central processing unit (central processing unit, CPU), or may be another general purpose processor, a digital signal processor (digital signal processor, DSP), an application-specific integrated circuit (application-specific integrated circuit, ASIC), a field programmable gate array (field programmable gate array, FPGA), another programmable logic device, a discrete gate, a transistor logic device, a discrete hardware component, or the like. In addition, the access network device and the terminal device in the foregoing embodiments of the present invention may further include a component such as a memory. Herein, the memory may include a read-only memory and a random access memory, and provides the processor with an instruction and data. A part of the memory may further include a nonvolatile random access memory. For example, the memory may further store information about a device type. The processor invokes instruction code in the memory, to control other modules of the access network device and the terminal device in the embodiments of the present invention to perform the foregoing operations.

It should be understood that "one embodiment", "an embodiment", or "an embodiment of the present invention" mentioned in the whole specification means that particular features, structures, or characteristics related to the embodiment are included in at least one embodiment of the present invention. Therefore, "in one embodiment", "in an embodiment", or "in an embodiment of the present invention" that appears throughput the whole specification does not necessarily mean a same embodiment. Moreover, the particular features, structures, or characteristics may be combined in one or more embodiments in any appropriate manner.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

In addition, the terms "system" and "network" in this specification may be used interchangeably in this specification. It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only; that is, B may also be determined based on A and/or other information.

A person of ordinary skill in the art may be aware that, the units and algorithm steps in the examples described with reference to the embodiments disclosed in this specification may be implemented by electronic hardware, computer software, or a combination thereof. To clearly describe the interchangeability between hardware and software, the foregoing has generally described compositions and steps of each example based on functions. Whether the functions are implemented by hardware or software depends on particular applications and design constraint conditions of the technical solutions. A person skilled in the art may use different methods to implement the described functions for each particular application, but it should not be considered that the implementation goes beyond the scope of the present invention.

In several embodiments provided in this application, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual needs, to achieve the objectives of the solutions of the embodiments.

When the integrated unit is implemented in a form of a software function unit and sold or used as an independent product, the integrated unit may be stored in a computer readable storage medium. Based on such an understanding, the technical solutions of the present invention or the part that makes contributions to the prior art or some of the technical solutions can be substantially embodied in a form of a software product. The computer software product is stored in a storage medium, and contains several instructions for instructing a computer device (that may be a personal computer, a server, an access network device, or the like) to perform all or some of steps of the method described in the embodiments of the present invention. The storage medium includes any medium that can store program code, such as a USB flash drive, a removable hard disk, a read-only memory (ROM), a random access memory (RAM), a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource allocation method performed by a communications apparatus, the method comprising:
    determining a second resource indication value,
        wherein in response to $(L_{CRBGs}-1) \leq (M/2)$, the second resource indication value is equal to $(2N_{RBG}-K)(L_{CRBGs}-3)+RBG_{START}$, or in response to $(L_{CRBGs}-1) > (M/2)$, the second resource indication value is equal to $(2N_{RBG}-K)(M-L_{CRBGs}+1)-RBG_{START}-1$,
        wherein $N_{RBG}$ is a quantity of resource block groups comprised in all narrowbands of an uplink bandwidth, each narrowband comprises 6 resource blocks, a value of $N_{RBG}$ is equal to $$2 * \left\lfloor \frac{N_{RB}^{UL}}{6} \right\rfloor,$$

$L_{CRBGs}$ is a quantity of resource block groups allocated by an access network device, $RBG_{START}$ is an index of a starting resource block group allocated by the access network device,
        wherein K=9 and M=8 in response to the uplink bandwidth being 25 RBs, 50 RBs, 75 RBs, or 100 RBs, or K=5 and M=4 in response to the uplink bandwidth being 15 RBs, and
        wherein a first resource indication value is equal to: floor(second resource indication value/11)*32+(second resource indication value mod 11)+21, wherein floor is a round down function;
    determining a resource block allocation field in downlink control information,
        wherein a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration,
        wherein a value indicated by five least significant bits of the resource block allocation field is greater than 20, the resource block allocation field is used to indicate the first resource indication value,
        wherein the first resource indication value is used to indicate the quantity of resource block groups allocated to a terminal device and the index of a starting resource block group allocated to the terminal device, and
        wherein the quantity of allocated resource block groups is greater than or equal to 3 and is less than or equal to 8, and one resource block group comprises three resource blocks;
    sending the downlink control information to the terminal device; and
    receiving, on at least one resource block allocated to the terminal device, a physical uplink shared channel from the terminal device.

2. The method according to claim 1, wherein the $$\left\lceil \log_2 \left\lfloor \frac{N_{RB}^{UL}}{6} \right\rfloor \right\rceil + 5 \text{ bits}$$

of the resource block allocation field jointly indicate the first resource indication value.

3. An apparatus comprising:
    a memory storing program instructions; and
    a processor coupled to the memory, wherein the program instructions, when executed by the processor, cause the apparatus to:
    determine a second resource indication value,
        wherein in response to $(L_{CRBGs}-1) < (M/2)$, the second resource indication value is equal to $(2N_{RBG}-K)(L_{CRBGs}-3)+RBG_{START}$, or in response to $(L_{CRBGs}-1) > (M/2)$, the second resource indication value is equal to $(2N_{RBG}-K)(M-L_{CRBGs}+1)-RBG_{START}-1$,
        wherein $N_{RBG}$ is a quantity of resource block groups comprised in all narrowbands of an uplink bandwidth, each narrowband comprises 6 resource blocks, a value of $N_{RBG}$ is equal to $$2 * \left\lfloor \frac{N_{RB}^{UL}}{6} \right\rfloor,$$

$L_{CRBGs}$ is a quantity of resource block groups allocated by an access network device, $RBG_{START}$ is an index of a starting resource block group allocated by the access network device,
        wherein K=9 and M=8 in response to the uplink bandwidth being 25 RBs, 50 RBs, 75 RBs, or 100 RBs, or K=5 and M=4 in response to the uplink bandwidth being 15 RBs, and
        wherein a first resource indication value is equal to: floor(second resource indication value/11)*32+(second resource indication value mod 11)+21, wherein floor is a round down function;
    determine a resource block allocation field in downlink control information,
        wherein a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration,
wherein a value indicated by five least significant bits of the resource block allocation field is greater than 20, the resource block allocation field is used to indicate the first resource indication value,
wherein the first resource indication value is used to indicate the quantity of resource block groups allocated to a terminal device and the index of a starting resource block group allocated to the terminal device,
wherein the quantity of allocated resource block groups is greater than or equal to 3 and is less than or equal to 8, and one resource block group comprises three resource blocks;
send the downlink control information to the terminal device; and
receive, on at least one resource block allocated to the terminal device, a physical uplink shared channel from the terminal device.

4. The apparatus according to claim 3, wherein the $$\left\lceil \log_2 \left\lfloor \frac{N_{RB}^{UL}}{6} \right\rfloor \right\rceil + 5 \text{ bits}$$

of the resource block allocation field jointly indicate the first resource indication value.

5. The apparatus according to claim 3, wherein the apparatus is the access network device.

6. A non-transitory computer-readable storage medium comprising instructions which, when executed by a computer, cause the computer to:
determine a second resource indication value,
wherein in response to $(L_{CRBGs}-1) < (M/2)$, the second resource indication value is equal to $(2N_{RBG}-K)(L_{CRBGs}-3)+RBG_{START}$, or in response to $(L_{CRBGs}-1) > (M/2)$, the second resource indication value is equal to $(2N_{RBG}-K)(M-L_{CRBGs}+1)-RBG_{START}-1$,
wherein $N_{RBG}$ is a quantity of resource block groups comprised in all narrowbands of an uplink bandwidth, each narrowband comprises 6 resource blocks, a value of $N_{RBG}$ is equal to $$2 * \left\lfloor \frac{N_{RB}^{UL}}{6} \right\rfloor,$$

$L_{CRBGs}$ is a quantity of resource block groups allocated by an access network device, $RBG_{START}$ is an index of a starting resource block group allocated by the access network device,
wherein K=9 and M=8 in response to the uplink bandwidth being 25 RBs, 50 RBs, 75 RBs, or 100 RBs, or K=5 and M=4 in response to the uplink bandwidth being 15 RBs, and
wherein a first resource indication value is equal to: floor(second resource indication value/11)*32+(second resource indication value mod 11)+21, wherein floor is a round down function;
determine a resource block allocation field in downlink control information,
wherein a size of the resource block allocation field is $$\left\lceil \log_2 \left\lfloor \frac{N_{RB}^{UL}}{6} \right\rfloor \right\rceil + 5 \text{ bits},$$

and $N_{RB}^{UL}$ is an uplink bandwidth configuration,
wherein a value indicated by five least significant bits of the resource block allocation field is greater than 20, the resource block allocation field is used to indicate the first resource indication value,
wherein the first resource indication value is used to indicate the quantity of resource block groups allocated to a terminal device and the index of a starting resource block group allocated to the terminal device, and
wherein the quantity of allocated resource block groups is greater than or equal to 3 and is less than or equal to 8, and one resource block group comprises three resource blocks;
send the downlink control information to the terminal device; and
receive, on at least one resource block allocated to the terminal device, a physical uplink shared channel from the terminal device.

7. The non-transitory computer-readable storage medium according to claim 6, wherein the $$\left\lceil \log_2 \left\lfloor \frac{N_{RB}^{UL}}{6} \right\rfloor \right\rceil + 5 \text{ bits}$$

of the resource block allocation field jointly indicate the first resource indication value.

* * * * *

UNITED STATES PATENT AND TRADEMARK OFFICE
CERTIFICATE OF CORRECTION

PATENT NO. : 11,706,784 B2
APPLICATION NO. : 17/345847
DATED : July 18, 2023
INVENTOR(S) : Yu et al.

Page 1 of 1

It is certified that error appears in the above-identified patent and that said Letters Patent is hereby corrected as shown below:

In the Claims

Claim 1: Column 32, Line 1: "and $N_{RB}^{UL}$ is an uplink bandwidth configuration," should read -- and $N_{RB}^{UL}$ is an uplink bandwidth configuration, --.

Claim 3: Column 32, Line 33: "wherein in response to $(L_{CRBGs}-1)<(M/2)$, the second" should read -- wherein in response to $(L_{CRBGs}-1)\leq(M/2)$, the second --.

Claim 3: Column 33, Line 1: "and $N_{RB}^{UL}$ is an uplink bandwidth configuration," should read -- and $N_{RB}^{UL}$ is an uplink bandwidth configuration, --.

Claim 6: Column 33, Line 34: "wherein in response to $(L_{CRBGs}-1)<(M/2)$, the second" should read -- wherein in response to $(L_{CRBGs}-1)\leq(M/2)$, the second --.

Claim 6: Column 34, Line 20: "and $N_{RB}^{UL}$ is an uplink bandwidth configuration," should read -- and $N_{RB}^{UL}$ is an uplink bandwidth configuration, --.

Signed and Sealed this
Thirty-first Day of October, 2023

Katherine Kelly Vidal
*Director of the United States Patent and Trademark Office*